United States Patent
Irwin et al.

(10) Patent No.: US 9,022,430 B2
(45) Date of Patent: May 5, 2015

(54) TEMPORARY UTILITY SERVICE APPARATUS

(76) Inventors: Robert L. Irwin, Essex, IL (US); Richard Dahl, Valparaiso, IN (US)

(*) Notice: Subject to any disclaimer, the term of this patent is extended or adjusted under 35 U.S.C. 154(b) by 107 days.

(21) Appl. No.: 13/290,860

(22) Filed: Nov. 7, 2011

(65) Prior Publication Data

US 2013/0113206 A1    May 9, 2013

(51) Int. Cl.
    H02G 3/06    (2006.01)
    F16L 9/19    (2006.01)
    F16L 11/22   (2006.01)
    F16L 39/00   (2006.01)

(52) U.S. Cl.
    CPC . *F16L 9/20* (2013.01); *F16L 11/22* (2013.01); *F16L 39/00* (2013.01); *H02G 3/06* (2013.01); *Y10S 285/907* (2013.01)

(58) Field of Classification Search
    USPC ........ 285/125.1, 129.1, 133.11, 152.1, 154.1, 285/907; 439/95, 207–211; 174/650
    See application file for complete search history.

(56) References Cited

U.S. PATENT DOCUMENTS

| | | | | |
|---|---|---|---|---|
| 269,085 | A * | 12/1882 | McLaughlin | 138/116 |
| 1,917,191 | A * | 7/1933 | Edwards | 184/7.2 |
| 2,324,791 | A * | 7/1943 | McLoughlin et al. | 220/3.8 |
| 3,958,850 | A * | 5/1976 | Ayer | 439/355 |
| 4,399,371 | A * | 8/1983 | Ziff et al. | 307/147 |
| 5,149,277 | A * | 9/1992 | LeMaster | 439/207 |
| 6,730,844 | B2 * | 5/2004 | Reiker | 174/650 |
| 6,832,788 | B2 * | 12/2004 | Fukano et al. | 285/124.5 |
| 7,914,049 | B2 * | 3/2011 | Vinci | 285/235 |
| 2002/0079697 | A1 * | 6/2002 | Griffioen et al. | 285/123.1 |
| 2003/0080555 | A1 * | 5/2003 | Griffioen et al. | 285/133.11 |
| 2008/0017415 | A1 * | 1/2008 | Suter et al. | 174/650 |

* cited by examiner

*Primary Examiner* — Aaron Dunwoody
*Assistant Examiner* — Fannie Kee
(74) *Attorney, Agent, or Firm* — The Watson I.P. Group, PLC; Jovan N. Jovanovic; Vladan M. Vasiljevic

(57) ABSTRACT

A utility service apparatus having at least one utility segment with a conduit system having an elongated body. A coupling structure is positioned at both ends. The coupling structure at one end is attachable to the coupling structure at the other end. A plurality of utility service components extend through the elongated body. Coupling a first end of a first utility segment with the second end of another utility segment assembly operably connects each of the plurality of utility service components to another utility segment assembly. Some of the segment assemblies include a unit head positioned along the elongated body. The unit head has a plurality of utility service ports coupled to the utility service components. Service implements can be attached thereto.

11 Claims, 6 Drawing Sheets

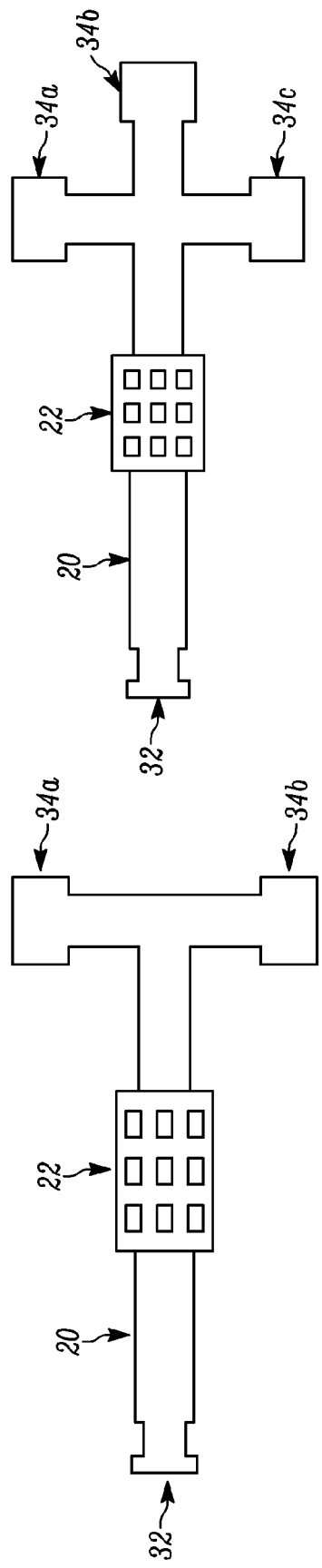
Figure 3(a)
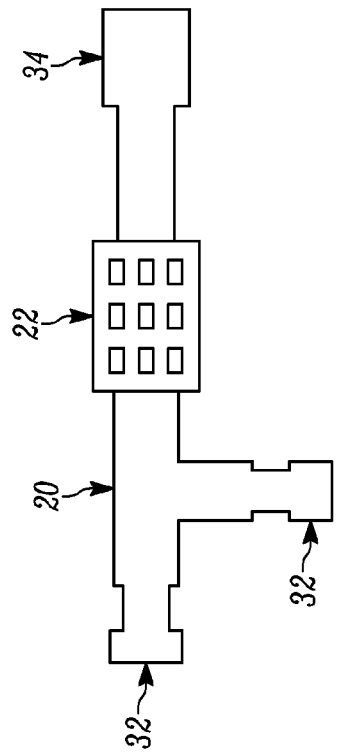
Figure 3(b)
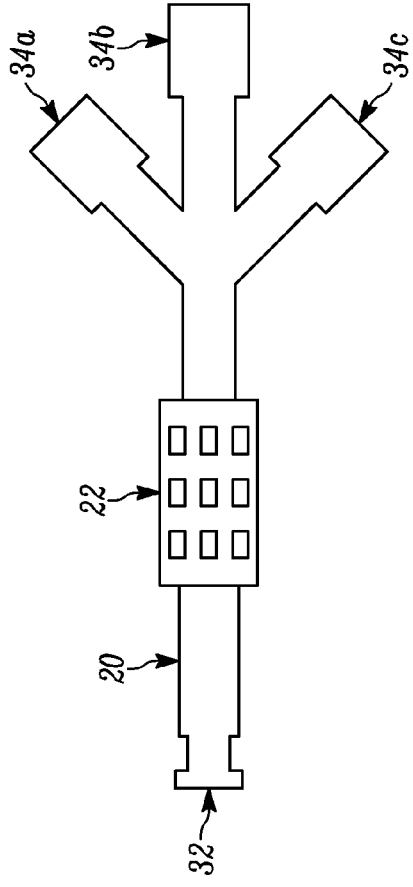
Figure 3(c)
Figure 3(d)

TEMPORARY UTILITY SERVICE APPARATUS

BACKGROUND OF THE DISCLOSURE

1. Field of the Disclosure

The disclosure relates in general to utility service lines, and more particularly, to a temporary utility service apparatus, which provides various utilities, including, but not limited to electrical power, compressed air, communications, etc. to remote locations in a temporary and reconfigurable manner. The apparatus is particularly well suited for use in association with repair installations at remote locations where such utilities are required for short periods of time. Of course, nothing in the application shall limit the disclosure and the user of the device to a temporary use or to use in association with a particular industry, type of installation, etc.

2. Background Art

The need for utilities in remote locations is well known. Typically, extension cords, long cable and long hoses are used to provide remote locations with electrical power, compressed air, and other utilities. While this is suitable for some installations, in certain environments, the use of such devices poses problems. For example, where the hoses and cables are routed near areas that are also traversed by users, often, it is easy to become tangled with the hoses and cables, or to otherwise negatively interface with the same.

In other situations, it is often the case that these hoses and cables are generally exposed and there is a risk of cutting one of the lines which can lead to costly replacement time and cost as well as injury (i.e., electrocution).

Thus, it would be advantageous to provide utility power which is housed in conduit in a manner which allows for easy installation, easy reconfiguration, and easy expansion even in remote locations.

In addition, it would be advantageous to provide the same in a reusable configuration.

It would also be advantageous to provide an apparatus for providing utility service wherein the utility could be monitored from a central location.

SUMMARY OF THE DISCLOSURE

The disclosure is directed to a utility service apparatus which includes at least one utility segment. The utility segment includes a conduit system in the form of an elongated body having a first end and a second end. A coupling structure is positioned at the first end and the second end. The coupling structure that is positioned at the first end is operable couplable to the coupling structure positioned at the second end. The conduit system further includes a plurality of utility service components extending through the elongated body each having a first end and a second end which coincides with the first and second ends of the elongated body, respectively. Upon coupling a first end of a first utility segment with the second end of another utility segment assembly operably connects each of the plurality of utility service components to another utility segment assembly. At least some of the segment assemblies include a unit head positioned between the first and second end of the elongated body. The unit head has a body defining a cavity with a control surface having a plurality of utility service ports coupled to the utility service components. Service implements can selectively be attached to the utility service ports.

In one embodiment, the at least one utility segment assembly further includes a plurality of second ends, so as to define a connector that branches at one end into at least two separate branches.

In another embodiment, the at least one utility segment assembly comprises a plurality of utility segment assemblies.

In yet another embodiment, the utility service components comprise one of the group consisting of: fresh air (for example, for a breathing system), service air system (i.e., pressurized air or unpressurized, and various gasses), electrical service (multiple different voltages are contemplated), data transmission service (coaxial cable, network cables, fiber optic cable, telephone cable, among others), audio and video cables (RCA, HDMI, s-video, among others). Of course, it is not limited solely to these utility service components.

In another embodiment, the utility service apparatus includes a control box having a coupling structure configured to couple to the coupling structure at the first end of the conduit system and a plurality of connections configured to interface each of the plurality of utility service components with an outside source.

In one such embodiment, a monitoring member is configured to provide data pertaining to each of the utility service components, and that monitoring member is associated with the control box.

In another embodiment, the coupling structure at the first end comprises a male coupling. The coupling structure at the second end comprises a female coupling. A locking mechanism is provided to releasably secure the female coupling and the male coupling. The locking mechanism further directs the male coupling and female coupling toward each other.

The conduit system includes at least one flexible portion along the length thereof.

In some embodiments, the flexible portion is structurally configured to extend between a first length and a second length, with the first length being shorter than the second length, and it is extendable any length between the first and second length.

In another embodiment, the utility segment assembly further includes at least one clamping member coupled thereto, and attachable to an outside structure.

In another such embodiment, the unit head further includes at least one auxiliary utility component.

Preferably, the at least one auxiliary utility component comprises a light.

In another embodiment, the at least one utility segment assembly comprises a plurality of utility segment assemblies. The plurality of utility segment assemblies are provided in at least two different lengths, and a plurality of the plurality of utility segment assemblies are provided with a unit head.

BRIEF DESCRIPTION OF THE DRAWINGS

The disclosure will now be described with reference to the drawings wherein:

FIGS. 3(a) through 3(d) of the drawings is a schematic representation of the utility segment assembly of the present disclosure showing different first and second ends;

DETAILED DESCRIPTION OF THE DISCLOSURE

Figure 1:
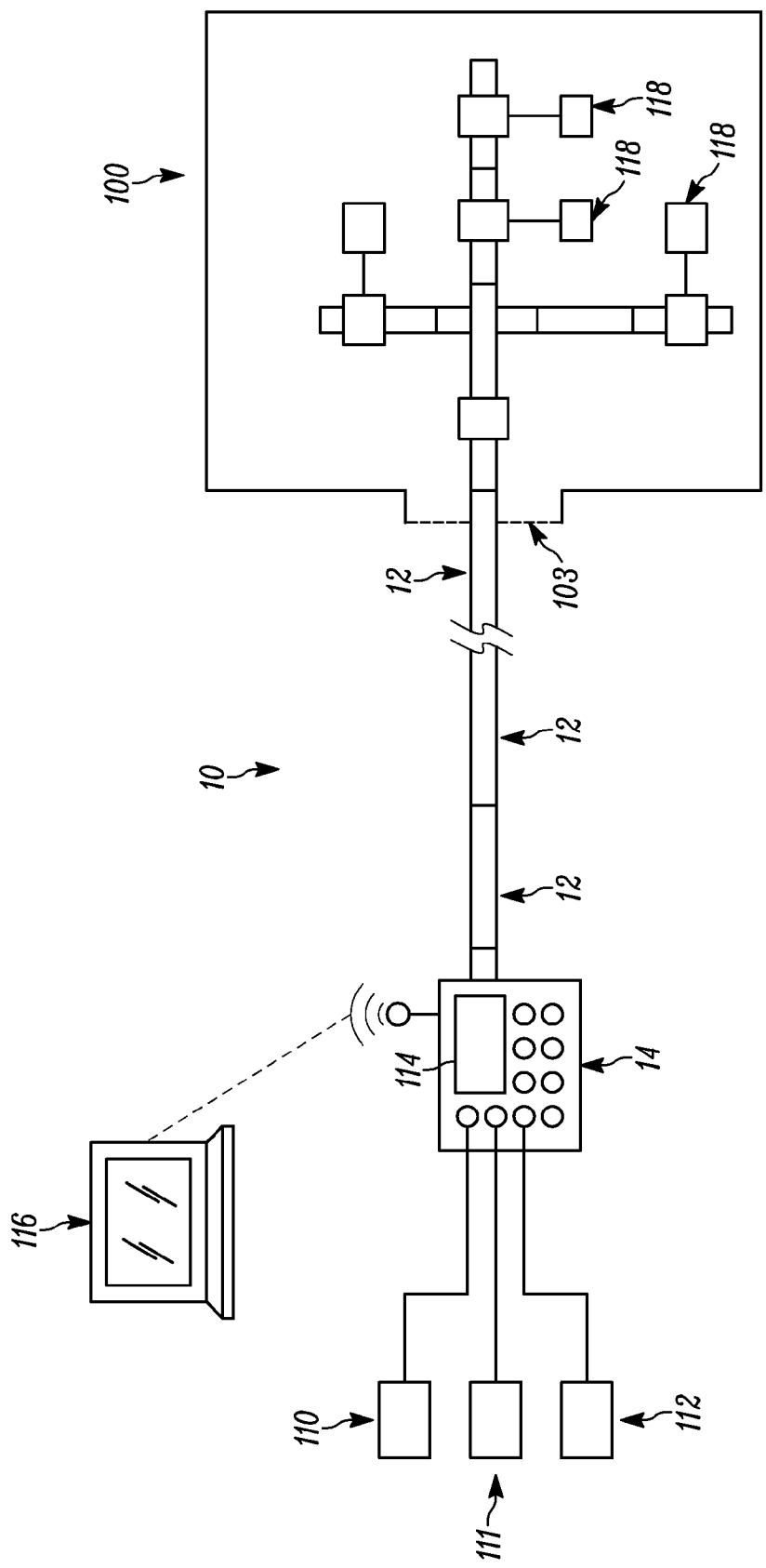
FIG. 1 of the drawings is a schematic representation of a temporary utility service apparatus of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the temporary utility service apparatus is shown generally at 10. The apparatus is configured from a plurality of utility segment assemblies 12 and control box 14. It will be understood that the purpose of the temporary utility service apparatus is to provide utility services at remote locations on a temporary basis. For example, when workers are working within a large fuel storage tank 100 (on the order of several stories high and having diameters that are over 50 feet), it is often necessary to provide different utilities to the workers. Rather than having a tangled mess of utility lines, cables and hoses which have a whole host of problems, the apparatus provides the utilities where needed in a convenient and easily configurable manner. This greatly increases safety, ease of use and productivity.

Figure 2:
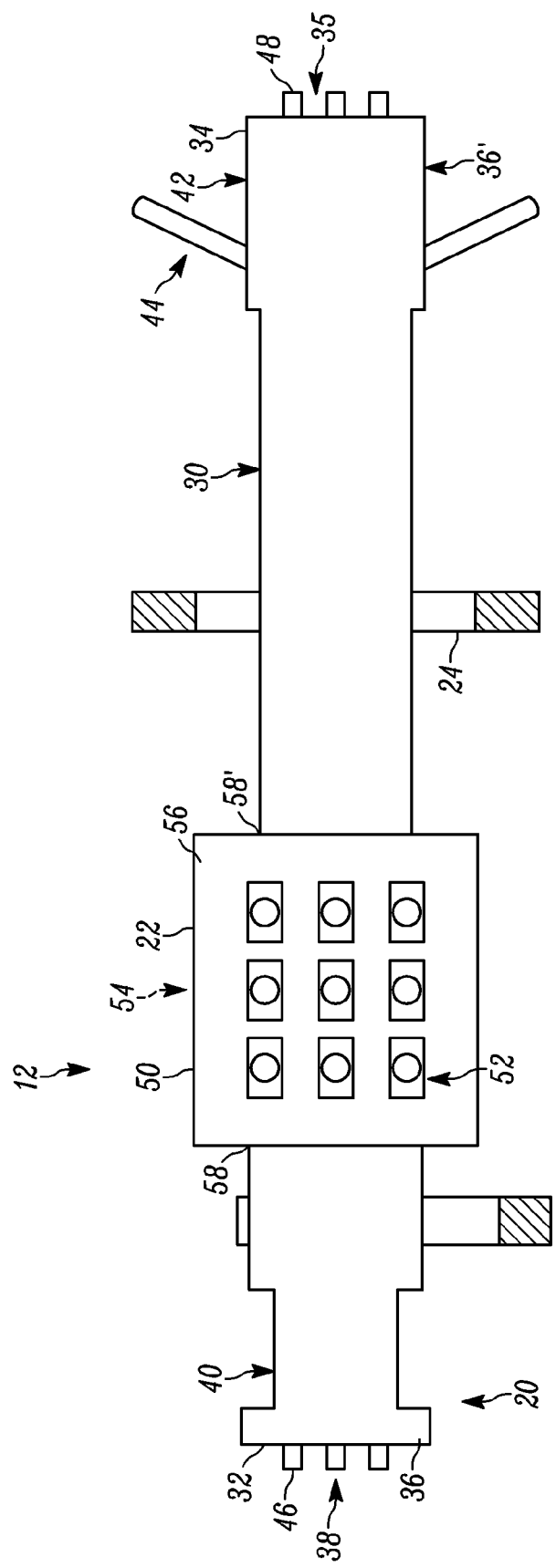
FIG. 2 of the drawings is a side elevational view of an exemplary utility segment assembly of the present disclosure.

The assemblies 12 may comprise a number of different configurations, and some of the configurations will be described below with the understanding that these are not the sole configurations, and that other variations are contemplated for use. One exemplary assembly 12 is shown in FIG. 2 as comprising conduit system 20 and unit head 22. The conduit system 20 includes elongated body 30 having a first end 32 and a second end 34. The elongated body 30 generally comprises an elongated tubular member which defines cavity 35. In the embodiment shown, the elongated body comprises a member of uniformly circular cross-sectional configuration. Of course, other configurations are contemplated for use, some of which are uniform in configuration and otherwise.

Figure 2B:
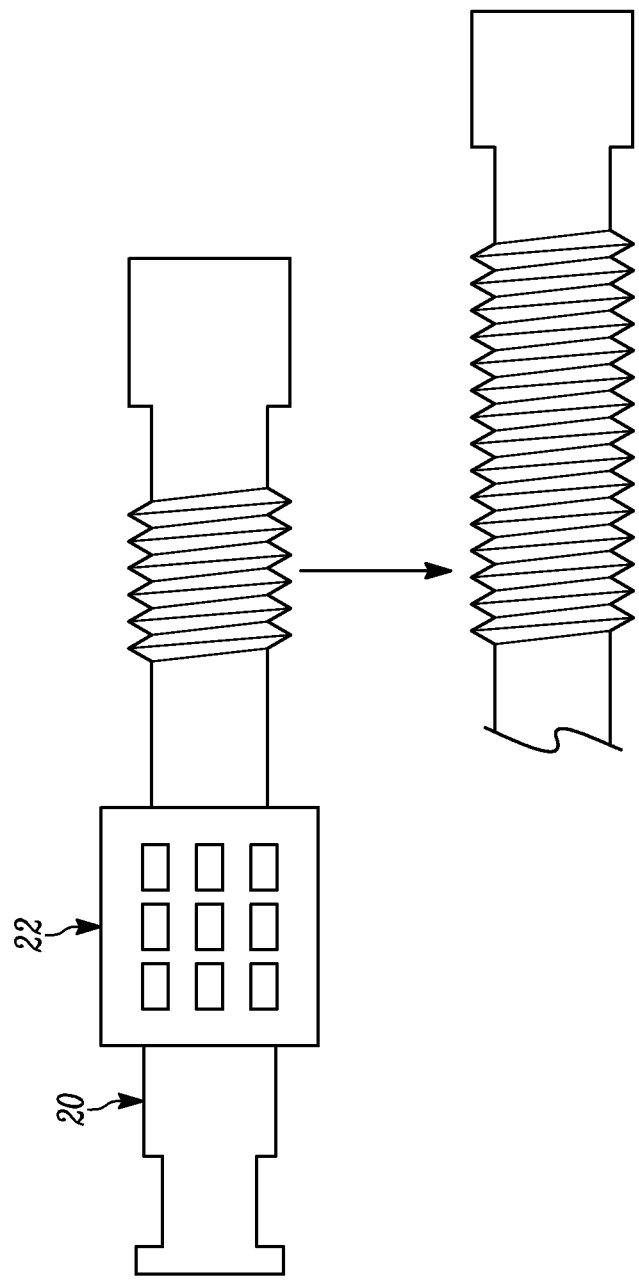
FIG. 2(a) of the drawings is a composite side elevational view of an exemplary utility segment assembly of the present disclosure showing a flexible and extendible conduit system.
Figure 4A:
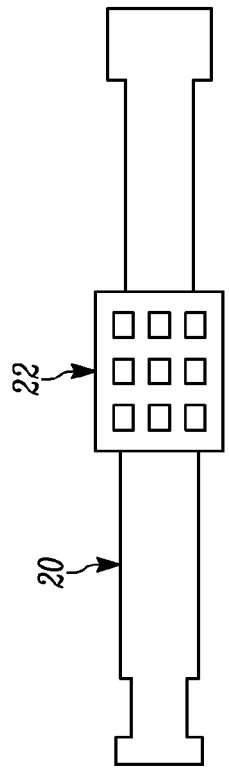
FIGS. 4(a) through 4(d) of the drawings is a schematic representation of the utility segment assembly of the present disclosure showing alternate positions of the unit head.
Figure 4B:
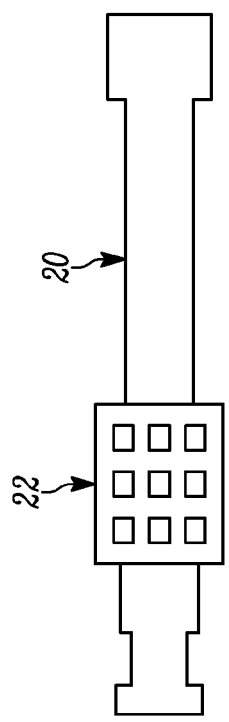
Figure 4C:
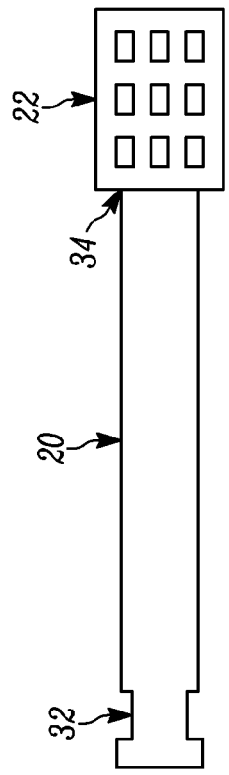
Figure 4D:
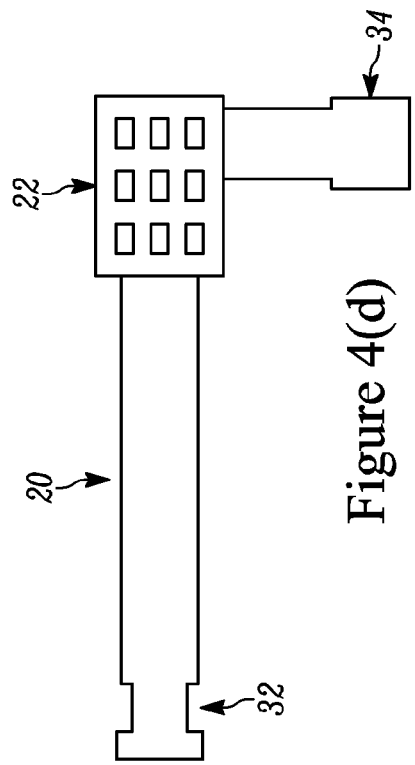

Generally, the elongated body 30 has a substantially rigid configuration, although it is contemplated that the elongated body may include segmented portions which allow for articulation, as well as flexible configurations which allow for a variety of different orientations and flexures. For example, and with reference to FIG. 2(b), a section of the elongated body may be corrugated wherein it can be elongated as well as bent/articulated in multiple directions.

The conduit system 20 includes coupling structures 36, 36' at each of the first end 32 and the second end 34. A number of different coupling structures are contemplated for use. One of the structures provides a locking coupling structure wherein the locking directs the components toward each other, and also provides for the coupling of the utility service components 38 (as will be further described below). One such configuration comprises male coupling 40 at coupling structure 36 and female coupling 42 at coupling structure 36'. The female coupling further includes locking mechanism (or locking arms) 44. The operation of the device is such that the male coupling 40 includes a channel detent extending axially about the outer perimeter thereof. The male coupling 40 is introduced into the female coupling 42. When the arms are rotated, the arms cooperate with the channel detent and pull the male coupling 40 inwardly within the female coupling, while at the same time precluding further movement and removal of the couplings from engagement. The male and/or the female coupling can further be provided with gaskets and the like to insure that the connection is water-tight so as to preclude the passage of fluids into the cavity 35. It will be understood to one of skill in the art that different manners of coupling can be utilized to achieve the desired features.

Utility service components 38 are positioned within the cavity 35 of the elongated body. Each of the utility service components 38 include first end 46 which coincides with first end 32 of the elongated body, and second end 48 which coincides with the second end 34 of the elongated body 30. The first end of the utility service components is configured to mate to a second end of another utility segment assembly further upstream or downstream. Similarly, the second end of the utility service component is configured to mate to a first end of another utility segment assembly further upstream or downstream.

The utility service components can be any one or more of a number of different utility services that may be required at a remote location, and preferably on a temporary or permanent basis. Among other utility service components, the following utility services are contemplated, namely, fresh air (for example, for a breathing system), service air system (i.e., pressurized air or unpressurized, and various gasses), electrical service (multiple different voltages are contemplated), data transmission service (coaxial cable, network cables, fiber optic cable, telephone cable, among others), audio and video cables (RCA, HDMI, s-video, among others), among others. It will be understood that the different utility service components can be mixed and matched for particular usages. It will also be understood that the disclosure is not limited to any particular configurations. It is contemplated that the configurations mate upon actuation of the locking mechanism or arm of the coupling structures which are at each end of the elongated body. As such, it is typically preferred that, where possible, the first end of the utility service component is substantially fixed to the first end 32 of the elongated body 30 (or at least precluded from inward movement relative thereto) so that when the male coupling 40 and the female coupling of an adjacent conduit system are joined, the adjacent utility service components are joined together in a serviceable configuration. Thus, the user will know that the utility service components are ready for use upon coupling of the conduit system. It will also be understood that the different utility service components include valves and terminations so that the particular conduit system is operational upon connection and is operational even if there is no further utility segment assembly connected thereto.

It will also be understood that in certain configurations, it may be necessary that additional ends are provided so that the conduit system has, for example, two or more second ends (or first ends, or both). For example, and as shown in FIGS. 3(a) through 3(d) a number of different configurations are contemplated. This includes the T configuration of FIG. 3(a), wherein two second ends are provided, namely second end 34a and second end 34b. In FIG. 3(b) three second ends are provided, namely second end 34a, second end 34b and second end 34c. In yet other embodiments, these ends can be configured with different angular displacements relative to each other. For example, in FIG. 3(b), the three second ends are each at right angles to each other, whereas in FIG. 3(c), the three second ends are at acute angles relative to each other. In the example of FIG. 3(d), a second first end is provided. This, for example, may be utilized in a situation wherein the first end has one set of utility service components, and the second first end has one set of utility service components and the second end requires, or includes both. In such a configuration, the second end is configured with a unified set of the components of the first and second first ends.

In certain configurations, the utility segment assembly may include a single conduit system. In other configurations, the utility segment assembly may include one (or more) unit heads, such as unit head 22 of FIG. 2. The unit head provides a user connection to the utility service components 38 which extend through the conduit system. In certain instances, the unit head is positioned between the first and second ends. In other configurations, the unit head is positioned at the second end and acts as a termination point of a line. A number of orientations are shown for the unit head in FIGS. 4(a) through 4(d) with respect to the conduit system.

The unit head, in a typical configuration, wherein the unit head is positioned between the first and second ends, the unit head includes body 50, utility service ports, such as port 52 and auxiliary utility components 54. Generally, body 50 comprises a enclosure (in certain examples a rectangular cubic configuration) that defines a cavity. A control surface 56 is provided on the outside surface. It will be understood that while the control surface 56 is shown as comprising one substantially planar surface of a generally rectangular cubic configuration, other control surfaces are contemplated, such as multiple different surfaces, non-planar surfaces and the like.

In the embodiment shown, the elongated body 30 is substantially linear, and as such, it is shown as if it extends straight through the unit head 22. In such a configuration, the unit head 22 includes opposing conduit openings 58, 58' which provide ingress and egress for the utility service components 38 to unit head 22. The control surface 56 includes a plurality of utility service ports which are coupled to the utility service components 38 that extend therethrough. It will be understood that these ports may comprise any number of different ports, depending on the type of utilities that are associated with the conduit system. For example, a 110V outlet can be provided, as can a 220V port, as can a service air line, a telephone jack, a network jack among others. In certain embodiments, the control surface 56 may include a number of different openings which may be covered up or knocked out so as to cover or to expose different openings which are capable of holding utility service ports.

Figure 5:
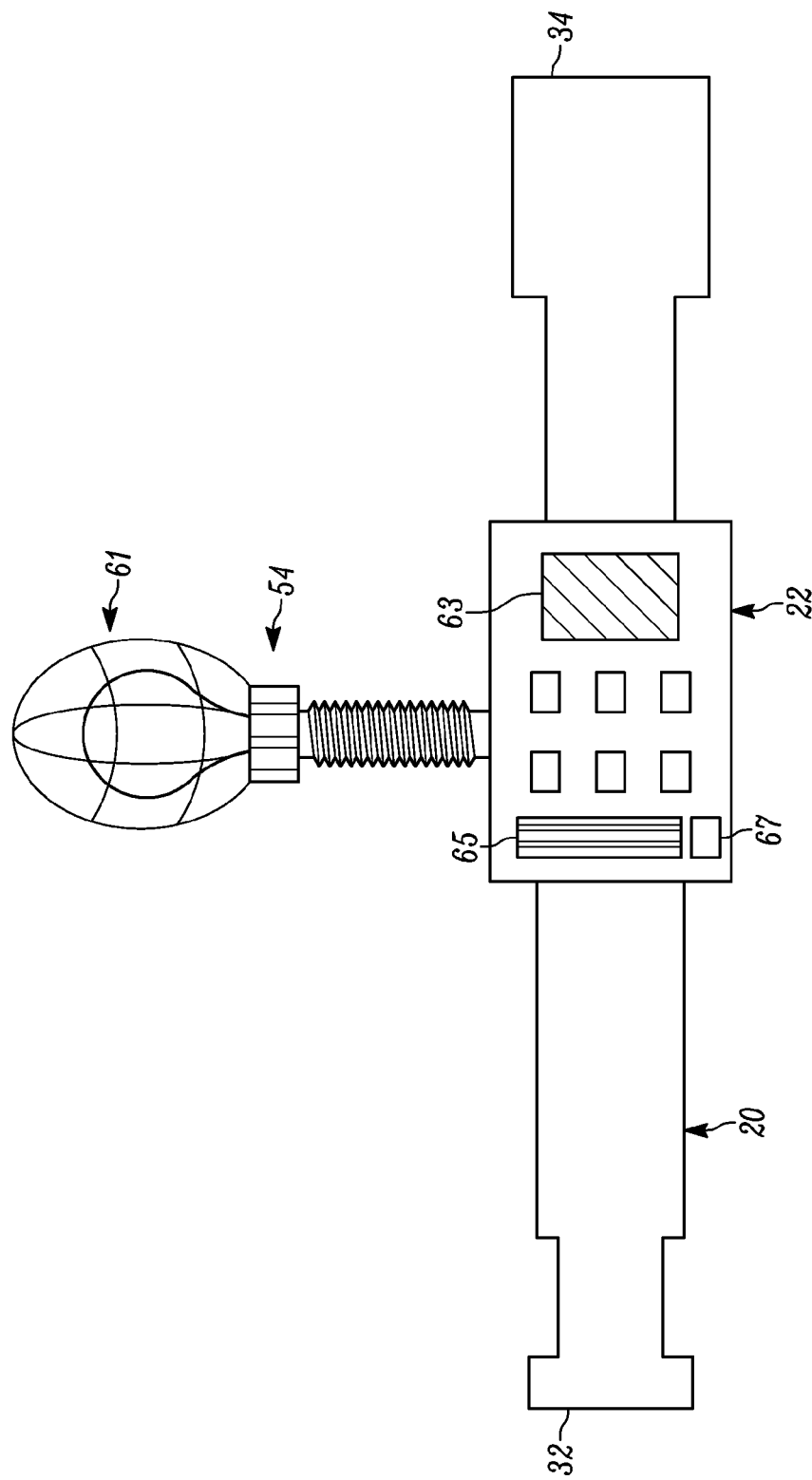
FIG. 5 of the drawings is a side elevational view of another exemplary utility segment assembly of the present invention.

In addition to the unit head 22 having utility service ports, the unit head may also include auxiliary utility components. For example, and with reference to FIG. 5, lights 61 (LED's, incandescent, fluorescents and the like) may be permanently coupled to the unit head. Additionally, the unit head may include, for example, LCD displays (such as LCD display 63) or LED's that indicate the status or other information regarding the particular service ports (i.e., pressures in air lines, or conditions of electrical outlets, etc.). Furthermore, a communication system, such as a speaker 65 and microphone 67 may be provided in the unit head to provide for communication along the utility service apparatus at predetermined intervals.

To assist with the placement of the utility segment assembly 12, at least one coupling member 24 can be coupled to either one or both of the conduit system and the unit head. The coupling member 24, in the embodiment shown, comprises a clamp which can be coupled to an outside structure to retain the same. In other embodiments, the coupling member may comprise a strap, a tie, adhesive bands, hook and loop fasteners, a hook or a loop, threaded fasteners and the like which facilitate the coupling of the utility segment assembly to an outside structure. The coupling member 24 may be permanently attached to the conduit system and/or to the unit head, or, the coupling member 24 may be removably attached to either or both of these structures. In addition, it will be understood that any utility segment assembly may include any number of different coupling members, which may be the same or different, and which may be permanently or removably attached.

It will be understood that the initial utility segment assembly, or one of the multiple utility segment assemblies is coupled to control box 14, shown in FIG. 1. The control box provides the initial input of the different utilities and attaches the different supplies thereto. For example, to provide air, a compressor 110 can be coupled to the control box 14. Additionally, a generator 111 can be coupled to the control box to provide electric power to the control box and to the conduit system. As another example, a router or a switch 112 can be coupled to the control box to provide communication capabilities to the conduit system. Additional systems can be attached to the control box for further coupling to the utility segment assemblies. Proximate the particular utility connection, the control box may include a dial, a display or another means of providing feedback as to the status of that particular utility (such as display 114). In other embodiments, a computer 116, or a tablet, or a smartphone, or the like can be coupled to the control box 14 through wireless or wired means so as to provide the user with feedback as to the performance and the status of any of the utilities that are coupled to the device. In addition, it will be understood that each utility segment assembly may have a unique identifier and through one of the utility service components, the system may maintain the status and the configuration of the overall system. Such information can also be passed to the control box, and therethrough to any computing device coupled to the system.

In operation, and as explained above, the apparatus is very suitable for use in a temporary environment, wherein utilities are remotely needed. One such environment where the system is particularly suited is for use in association with the repair of fuel storage tanks and the like. These storage tanks are quite large and may require work anywhere therewithin. Typically ingress and egress to and from the cavity is accomplished through an opening in the side of the tank. Typically, the opening is not very large and with a number of utility lines extending through the same opening, it is often the cause of tripping, tangling and other problems. The temporary utility service apparatus is particularly well suited in such an application, but, it is not limited to use in any particular environment or any particular configuration.

One exemplary embodiment of such an installation is shown in FIG. 1. The tank 100 includes opening 103 for providing ingress to and egress from the tank 100. In such a configuration, scaffolding or ladders and the like may be positioned at various locations within the tank proximate the location where users will be utilizing different equipment. In such an environment, first, a control box 14 is provided. The control box is coupled to each one of the services that are required within the tank as the control box will provide these utilities to the utility segment assemblies.

More specifically, the control box is attached to, for example, a generator to provide electrical power and to a large compressor to provide compressed air to power different tools 118 within the tank (i.e., impact wrenches, air sanders, etc.). In addition, a computing device with a monitor (or a monitor alone) is also coupled to the control box to provide feedback as to the status of the utilities connected to the control box. The control box is positioned a sufficient distance from the tank so that it is out of the way and so that it does not present a hazard.

Once the control box 14 is positioned, a first utility segment assembly is coupled to the control box. Typically, the control box includes a coupling structure which interfaces with the first end of the conduit system. Once locked on, the utility service components are energized from the control box. Subsequently, sequential utility segment assemblies can be sequentially attached to the first such assembly. Where no utilities are needed, the utility segment assemblies may comprise solely a conduit system and can be without a unit head. In addition, it will be understood that the utility segment assemblies can be provided in different lengths. For example, a number of utility segment assemblies can be utilized without unit heads outside of the tank where it is not contemplated that the utilities will be required.

Once the utility segment assemblies stretch into the tank, they can be branched into different legs through the use of assemblies which have more than one second end. The separate branches can be extended to the desired locations. Proximate the locations where utilities will be required, assemblies that include unit heads 22 can be provided. At each of these unit heads, a user can couple the requisite item needed. For example, a relatively short air hose can couple the user's air tool and the utility service component through the respective port, all proximate the user's work location.

As many assemblies with unit heads can be utilized as is necessary for the particular application. It will also be understood that as the user moves to different locations within the tank, additional utility segment assemblies can be attached without requiring the detachment of any of the prior positioned assemblies. The valves and terminating structures allow for the utility segment assemblies to be energized and working upon coupling, and without requiring dead ends and terminal points at the end of each line or branch. Thus, as the user moves within the tank, it is not necessary to decouple any of the assemblies.

With certain assemblies, auxiliary utility components, such as lamps and the like may be positioned. These are useful in that not only are utility services provided to the user where it is needed, but lighting is also built into the assembly. In certain situations, it may be helpful to attach the assemblies to outside structures, such as the tank, scaffolding, ladders, stakes and the like to retain the assemblies in position. This can be achieved through the coupling members 24 which are joined to the utility segment assemblies.

When the project is completed, the utility segment assemblies can be taken apart from each other. The different segment assemblies are reusable at different locations. They can also be reconfigured into any number of different configurations, depending on the particular use and setup that is required.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A utility service apparatus comprising:
   a plurality of utility segment assemblies, each of the plurality of utility segment assemblies including:
   a conduit system in the form of an elongated body having a first end and a second end, a first coupling structure being positioned at the first end and a second coupling structure being positioned at the second end, wherein the first coupling structure positioned at the first end of a first one of the plurality of utility segment assemblies is operably couplable to the second coupling structure of a second one of the plurality of utility segment assemblies, the conduit system further including a plurality of utility service components extending through the elongated body, and each having a first end and a second end which coincides with the first and second ends of the elongated body, respectively, whereupon coupling a first end of the first one of the plurality of utility segment assemblies with the second end of the second one of the plurality of utility segment assemblies automatically operably connects the first end of the plurality of utility service components of the first one of the plurality of utility segment assemblies to the second end of the second one of the plurality of utility segment assemblies so as to be operably engaged; and
   at least one of the plurality of utility segment assemblies further including a unit head positioned between the first and second end of the elongated body, the unit head including a body defining a cavity with a control surface having a plurality of utility service ports operably coupled to the plurality of utility service components, with the service ports being accessible and usable by a user.

2. The utility service apparatus of claim 1 wherein the plurality of utility service components comprise one of the group consisting of: fresh air, service air system, electrical service data transmission service, audio and video cables.

3. The utility service apparatus of claim 1 further comprising a control box having a coupling structure configured to couple to the coupling structure at the first end of the conduit system and a plurality of connections configured to interface each of the plurality of utility service components with an outside source.

4. The utility service apparatus of claim 3 further comprising a monitoring member configured to provide data pertaining to each of the plurality of utility service components.

5. The utility service apparatus of claim 1 wherein the coupling structure at the first end comprises a male coupling, and the coupling structure at the second end comprises a female coupling, and further wherein a locking mechanism is provided to releasably secure the female coupling and the male coupling, wherein the locking mechanism further directs the male coupling and female coupling toward each other.

6. The utility service apparatus of claim 1 wherein the conduit system includes at least one flexible portion along the length thereof.

7. The utility service apparatus of claim 6 wherein the flexible portion is structurally configured to extend between a first length and a second length, with the first length being shorter than the second length.

8. The utility service apparatus of claim 1 wherein the plurality of utility segment assemblies further includes at least one clamping member coupled thereto, and attachable to an outside structure.

9. The utility service apparatus of claim 1 wherein the unit head further includes at least one auxiliary utility component.

10. The utility service apparatus of claim 9 wherein the at least one auxiliary utility component comprises a light.

11. The utility service apparatus of claim 1 wherein the plurality of utility segment assemblies are provided in at least two different lengths, and a plurality of the plurality of utility segment assemblies are provided with a unit head.

\* \* \* \* \*